United States Patent [19]
Keser et al.

[11] 3,993,148
[45] Nov. 23, 1976

[54] METHOD AND DEVICE FOR SUPPLYING A WORM MACHINE WITH MATERIAL-PARTIAL PIECES DOSED BY WEIGHT

[75] Inventors: Fridolin Keser, Hemmingen; Wilhelm Seufert, Korntal; Ralf Urban, Markgroningen, all of Germany

[73] Assignee: Werner & Pfleiderer, Stuttgart, Germany

[22] Filed: Nov. 27, 1974

[21] Appl. No.: 527,846

[30] Foreign Application Priority Data
Nov. 27, 1973 Germany............................ 2358970

[52] U.S. Cl................................. 177/50; 177/114; 177/119; 177/145; 83/73; 83/77; 83/359
[51] Int. Cl.².................. G01G 19/52; G01G 13/24; G01G 13/02; B26D 5/08
[58] Field of Search.................. 177/1, 50, 114, 119, 177/145; 83/73, 77, 79, 358, 359

[56] References Cited
UNITED STATES PATENTS

| | | | |
|---|---|---|---|
| 2,571,976 | 10/1951 | Ward | 83/77 UX |
| 3,379,233 | 4/1968 | Kasper | 83/77 X |
| 3,379,234 | 4/1968 | Kasper | 83/77 X |
| 3,732,761 | 5/1973 | Sanders | 83/73 X |
| 3,800,894 | 4/1974 | Keser et al. | 177/119 X |
| 3,846,958 | 11/1974 | Divan | 177/50 |

*Primary Examiner*—George H. Miller, Jr.
*Attorney, Agent, or Firm*—Walter Becker

[57] ABSTRACT

A method of and device for feeding into the charging funnel of a worm machine strip-shaped or irregularly formed partial pieces of material, especially rubber, dosed by weight as components of a mixture, according to which the pieces are weighed individually and are conveyed to the worm machine in a cycle sequence time compensating for the difference of the rated value or preselected weight and the actual value of the weight of the individual piece. The device for practicing the method according to the invention has an electric scale preferably connected to an analog converter, which scale feeds a starting voltage proportional to the actual weight of the partial pieces to a rated value — actual value comparator and to an electric calculator which latter determines the change in the cycle sequence time in conformity with the deviation from the preselected weight of the respective partial piece.

6 Claims, 1 Drawing Figure

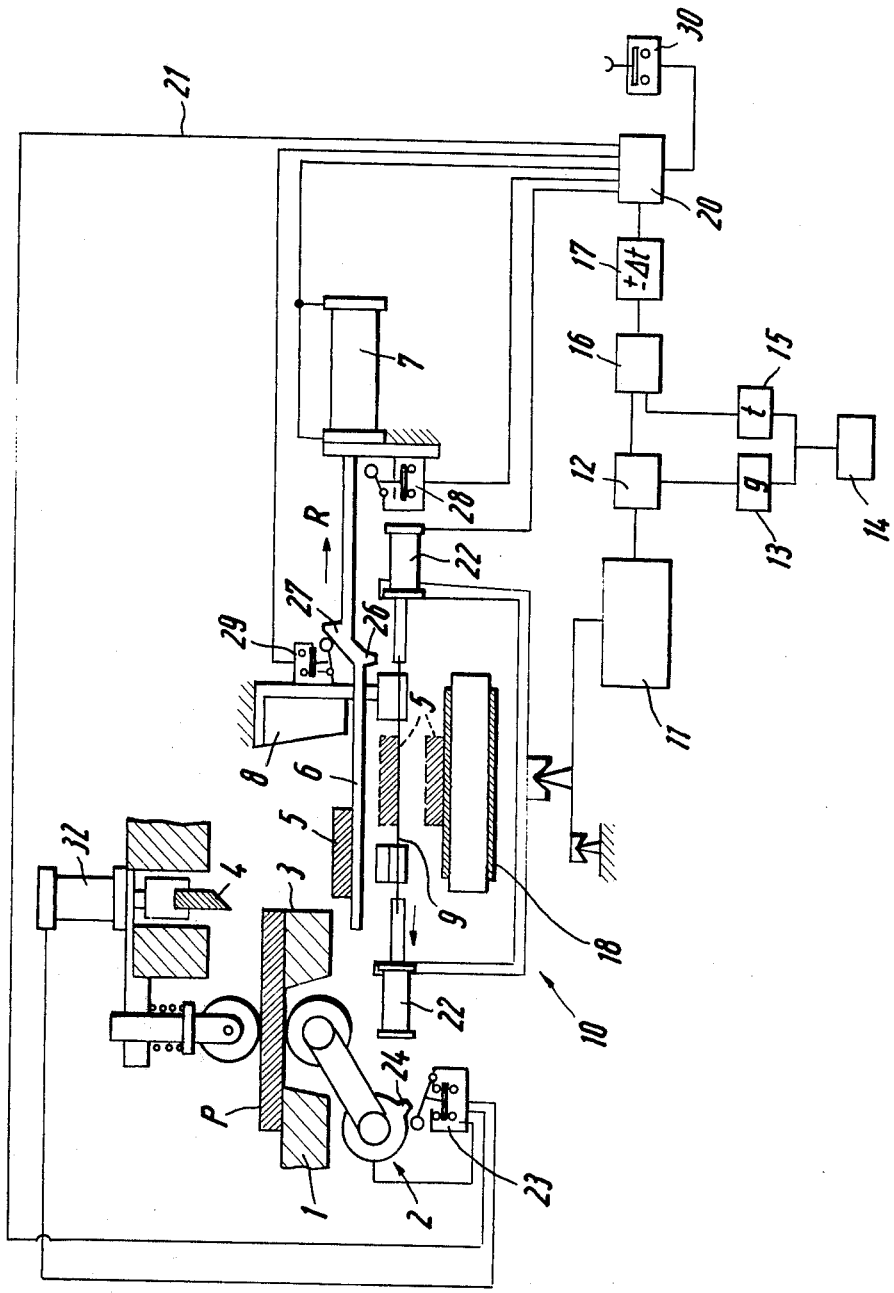

METHOD AND DEVICE FOR SUPPLYING A WORM MACHINE WITH MATERIAL-PARTIAL PIECES DOSED BY WEIGHT

The present invention relates to a method and device for feeding and dosing by weight strip-shaped or irregularly formed partial pieces of a material especially rubber as components of a mixture, into the charging device of a worm machine.

The continuous preparation or refining especially of rubber is effected in a worm machine while simultaneously a plurality of mixture components are added which are introduced into the charging device of the worm machine. The addition of mixture components is effected in conformity with a recipe determined ratio of the mixing components relative to each other and requires a precise dosing of the individual mixing components. This precise dosing required for the mixture is equally important for the basic material rubber as well as for the additions.

It is known to stretch endless strips or bands of the basic material to be fed or to cut the same alternately on one side edge to thereby determine the respective quantity of addition. It is further known to convey strips or strip sections of a stacked rubber band to a hopper of a worm press in conformity with the degree of filling of the latter. With both of these heretofore known methods, the addition is determined exclusively volumetrically. This way of dosing, however, is not sufficient when the addition of one or more additional components it is intended to obtain a recipe true mixture in the extruder.

It is also known to cut off strip sections from a plate- or disc-shaped plastic material and continuously measure the weight of a plurality of such strip sections deposited on a conveyor-type weigher, and in order to obtain a uniform throughput to control the time intervals of the strip sections deposited on the coneyor-type weigher, by means of a transit barrier which in conformity with the load changes on the band-type conveyor is brought into action by an electronic scanning device.

This device has the drawback that due to the simultaneous deposit of a plurality of strip sections on the weigher, a timewise displacement is caused by the control operation during the discharge from the weigher, said timewise displacement occurring when the weight of the individual strip sections greatly varies. In this connection it is necessary that the ascertainment of the total weight of a plurality of individual strips is effected with a precision which must be all the higher the more individual strips are simultaneously to be weighted. Moreover, with this known device it is also necessary that the partial pieces with regard to their form dimensions are as uniform as possible if the necessary uniform charging of the weigher is to be assured. Moreover, the strip section must not exceed the tolerance limits required by their weight, if a practical dosing by weight is to be realized.

It is, therefore, an object of the present invention to provide a method and a device for carrying out said method, which will obviate the above mentioned drawbacks and will make possible a weight-dosed supply of the basic material to be processed in individual or partial pieces, said supply being in conformity with the throughput of the worm machine.

These and other objects and advantages of the invention will appear more clearly from the following specification in connection with the accompanying drawing which diagrammatically illustrates a device for carrying out the method according to the present invention.

The problems underlying the present invention have been realized by the method according to the invention which is characterized primarily in that the partial pieces are weighed individually and in a time interval compensating for the rated value-actual value difference of the weight of the individual piece, are conveyed to the worm machine. In order to realize a gravimetric continuous dosing of partial pieces, the material to be processed in the worm machine, preferably rubber or another plastifiable material, may in its starting condition have a plate or band shape and may by means of a device or cutting machine be cut into strips or pieces. The size of the strip-shaped or irregularly formed partial pieces may to this end be advantageously determined in conformity with the dimensions of the charging opening of the worm machine.

By a controlled deposit of the partial pieces, a particularly uniform flow of material into the inlet of the extruder will be assured when according to a further development of the invention, the cycle sequence time of each partial piece is adapted to be stored for releasing the deposit of the next following partial piece.

In this connection it should be noted that for the extruder it is very advantageous when an approximately uninterrupted flow of material of the partial pieces can be conveyed to the extruder inlet. The partial pieces the difference in weight of which is due to different lengths, should in the timewise sequence reach the intruder inlet so that approximately a gap-free band of aligned individual pieces will be formed. This can be realized when the cycle time ascertained for the partial piece on the weigher is stored and releases the deposit of the next following partial piece from the weigher onto the conveyor belt.

It is furthermore advantageous when at least one dimension of the partial piece, for instance its width, is kept the same for all partial pieces. It is particularly advantageous when the length of the partial pieces amounts to a multiple of their width because in such an instance the pull-in of the partial pieces into the worm will occur under more favorable conditions.

The gravimetric dosing system according to the invention is based on the fact that in conformity with a predetermined throughput of the material in kilograms per hour, the lateral charging sequence of the partial pieces is effected in conformity with the respective weight of the individual partial pieces. Assuming for instance an hourly throughput of 500 kg, this would with a predetermined digital value of 1/000 result in a cycle sequence time $t_t$ and in a piece weight g of the partial pieces of $g=0.5$ kg. The mentioned cycle sequence time applies, however, only as long as the partial pieces have a uniform piece weight $g$ of a given value. If, however, the piece weight changes, with the method according to the invention, the cycle sequence time $t_t$ is post-controlled in such a way that the quotient of piece weight times cycle sequence $t_t$ remains constant.

With a device according to the present invention for carrying out the method of the invention, there is provided an electric scale which furnishes a starting voltage proportional to the actual weight to a rated actual weight comparator and to an electric calculator which determines the change in the cycle sequence time in conformity with the deviation from the rated value of the respective partial piece. Rated value is defined as preselected weight. According to a further development of the invention, an electromechanically operable charging device for the partial pieces may be arranged in front of the scale, and on the bridge of the scale which carries the partial pieces during the weighing operation there may be provided a likewise electromechanically operable withdrawing device. These two devices are operable by a common control device acted upon by the calculator and a time member controlled by said calculator. According to a preferred embodiment of the invention, there may be provided a cutting device which precedes the scale, and an electrically controlled feeding device for the plate-shaped or band-shaped plastic (Presstoff) material. A particularly favorable operation at low expense for the control of the individual parts of the device is obtained when, according to a further development of the invention, the cutting device and the feeding device and/or the charging device and/or the withdrawing device are timewise parallely actuated with regard to the weighing operation and the cycle sequence time while advantageously for these devices a common control device may be provided.

Referring now to the drawing in detail, the device illustrated therein serves for a digital feeding dosed by weight of a plastic material into a non-illustrated worm press, to which said plastic material is conveyed in the form of plates P or a band on a cutting table 1 by means of an advancing device 2 beyond the cutting edge 3 to such an extent that in response to a downward movement of a cutting blade 4 partial pieces 5 are cut off from the plate P with a constant width at the end face in the illustrated position. The cut-off pieces 5 are successively received by a follower 6 which is adapted by means of an electromagnet or by a compressed air cylinder piston system to be withdrawn in the direction of the arrow R to such an extent that the partial piece can by means of a stationarily arranged stripper 8 be stripped off from the follower 6 whereupon it will occupy a position approximately in the center of the bridge of a scale 10, said last mentioned position being shown in dash lines. This scale 10 acts upon an analog convertor 11 which conveys a starting voltage which is proportional to the weight of the respective partial piece.

The starting voltage of the convertor 11 is connected to a rated value — actual value comparator 12 which is connected to a rated value indicator 13 for the piece weight g adjustable by means of a preselector 14. On the preselector 14 there can furthermore be set or adjusted the digital value of for instance 1/1000 split-up of the hourly throughput of the worm press.

Furthermore, there is provided a rated value indicator 15 for the basic time $t$ resulting from the digital value, which basic time with the given digital value amounts to 3.6 seconds. The output of the comparator 12 and of the rated valve indicator 15 for the basic time is conveyed to a calculator 16 which in a time element 17 reduces or extends the rated time $t$ by an amount so that a cycle sequence time $t_t$ is obtained in which the partial pieces 5 are separated successively and are by the bridge 9 of the scale 10 thrown onto a band 18 moving at uniform velocity, whereupon the partial pieces 5 pass into the inlet opening of the worm machine.

For the extruder it is of particular advantage when a practically gapless flow of material of partial pieces 5 is conveyed to the extruder inlet. To this end it is expedient when the cycle time ascertained for that partial piece 5 which is located on the scale 10 is stored and releases the discharge of the next following partial piece 5 from the scale bridge 9 onto the conveyor belt 18.

With the illustrated embodiment, a control device 20 is provided behind the time element 17. This control device 20 is adapted through the intervention of a control line 21 to bring about the turning on of a non-illustrated driving motor for the advancing device 2. Furthermore, two electric actuating elements 22 which are connected to the bridge 9 of the scale 10 are connected to the control device 20. These actuating elements 22 will in response to a pulse released by the control device pull the bridge 9 apart in axial direction so that the previously weighted partial piece is dropped downwardly onto the conveyor belt 18.

The individual partial pieces 5 respectively have a substantially identical width, while a preselector stroke switch 23 cooperates with the advancing device 2. Switch 23 is controlled by a cam 24 coupled to the advancing device 2 and respectively releases the cutting blade 4 when the plate P has been advanced by the predetermined width of a piece 5.

The follower 6 serving for depositing pieces 5 onto the bridge is provided with cams 26 and 27 of which the lower cam 26 is adapted at the end of the return movement designated with the letter R to close a first limit switch 28 which latter then causes the control device 20 to reverse the driving member 7 of a compressed air operable cylinder piston system to move into the opposite forward direction. This advancing movement is limited by a second limit switch 29 which is likewise connected to the control device 20 and causes the latter to turn the drive off in the advancing direction.

The operation of the device is as follows:

Starting

For purposes of starting the device, the first pulse for the advance 2 of the cutting device is released manually by depressing a manual switch 30 in connection with which the control device 20 is put into action. As soon as the plate P has been advanced by a distance necessary for the provided width, the cam 24 actuates the switch 23, stops the advance, and turns on the actuating device 32 for the cutting blade 4. The cut-off piece 5 then drops onto the follower 6 and after a brief delay preset in the control device 20, which delay starts with the release of switch 23, the follower 6 is moved by the driving element 7 in the direction of the arrow R and the piece 5 on the stripper 8 is dropped onto bridge 9.

Automatic course

In the end position of the return movement of the follower 6, the limit switch 28 is actuated by the cam 26, and the control device 20 shifts the follower 6 over for forward movement. At the end of the forward movement, cam 27 closes the second limit switch 29. The control pulse of the limit switch 29 as generated in this way brings about through the control device 20 again a turning on of the advancing device 2 until the switch 23 is actuated and in the above mentioned manner stops the advance, and the cutting operation is initiated. This process will then automatically be repeated.

Control Operation

When the first piece 5 during the first return movement of the follower 6 has been placed onto the scale bridge 9, the scale 10 will through the analog convertor 11 in a minimum time generate a control voltage which is proportional to the weight g of the piece 5. Through the intervention of the rated actual value comparator 12 and the calculator 16, the cycle sequence time $t'$ is ascertained and conveyed to the time member 17. This time member will after the expiration of the received cycle sequence time convey a pulse through the control device for opening the scale bridge 9 and for throwing off the second weighed piece 5 onto the conveyor belt 18.

The first piece 5 is after its weight has been registered thrown immediately onto the conveyor belt 18 from where it passes into the intake opening of the non-illustrated worm machine.

The throwing off of the second piece 5 is effected after the stored cycle sequence time of the first piece 5 has expired. This operation is repeated in the same manner with each further added piece 5. The return of the scale bridge 9 for receiving the respective next piece 5 to be weighed is always initiated after a constant time delay. This time delay may start in a simple manner as soon as the throwing off of a time piece starts. The pulse generated by the time element 17 additionally through the intervention of a control device 20 with a constant delay will bring about the initiation of the return movement of the follower for depositing of the next cut-off piece 5.

In conformity with the respective actual value of the weight g of the individual pieces 5, which actual value has been ascertained by the scale 10 or the analog convertor 11, the following control conditions may occur:

1. Actual value = rated value

On the rated-actual value comparator 12 a difference value of zero is read. The calculator 18 will not influence the rated value $t$ of the cycle sequence time in the time indicator 17. The time indicator 17 will therefore after the expiration of the cycle sequence time $t_t = t$ of the rated value indicator 15 emit a pulse to the control device 20 for throwing off the next following piece 5 from the scale bridge 9 onto the conveyor belt 18.

2. Actual value less than rated value

Through the rated value — actual value comparator 12 a minus difference is obtained. The calculator 16 ascertains and corrects in conformity with the deviation the cycle time $t_t$ in a reducing sense in such a way that at a time period prior to the end of the rated time $t$, the next following piece 5 is thrown off from the scale bridge 9 onto the conveyor belt 8, and the next cutting off and weighing operation is initiated.

3. Actual value greater than rated value

In this instance, the calculator 16 corrects the cycle time in a prolonging sense so that the throwing off of the next following piece 5 from the scale bridge 9 onto the conveyor belt 18 and the next following cutting-off and weighing operation will be effected correspondingly later.

With the outlined embodiment, it is provided that the cutting device 1 and the advancing device 2 as well as the follower 6 acting as receiving device, and the throwing-off device with the actuating elements 22 on the scale bridge 9 have been actuated timewise parallel to the weighing operation. In this way, it is possible that a very wide range of variation of the weight of the pieces 5 can also be taken into consideration within the region of the minus tolerances.

It is, of course, to be understood that the present invention is, by no means, limited to the specific showing in the drawing but also comprises any modifications within the scope of the appended claims.

What we claim is:

1. A device for cutting and feeding into the charging funnel of a worm machine strip-shaped or irregularly formed pieces of material to achieve a preselected total weight of material over a definite period of time, especially rubber as a component in a mixture, which includes an electric scale preferably associated with an analog converter, which scale is operable to furnish inputs to a value comparator and to an electric calculator, said electric calculator being operable to determine the change in the time between cutting and feeding the next piece, an electrically triggered advancing device for handling the cut material between the cutting operation and the weighing operation, said triggered advancing device being reciprocally moved to accept a cut piece and to drop the cut piece on the electric scale, two cams coupled to said advancing device and operable in response to the completion of a preset advancing stroke to stop said advancing device in each direction and a control device that controls the time between reciprocal movements as determined by the electric calculator.

2. A device according to claim 1, in which in front of the scale there is arranged an electromechanical operable charging device for the partial pieces, and in which there is provided a likewise electromechanically operable withdrawing device, both devices being operable by a common control device acted upon by said calculator and by a time member controlled by said calculator.

3. A device according to claim 1, which includes a switch cooperating with said cams and operable to actuate the cutting operation.

4. A device according to claim 1, in which the cutting and the feeding and/or the charging, and/or the receiving are timewise actuated parallel to the weighing operation and the cycle sequence time.

5. A device according to claim 1, which includes a preselecting device for setting the piece weight and the digital ratio, and the throughput of the plastic material, a rated weight indicator, and an actual value for basic time being connected to said preselecting device.

6. A device according to claim 5, in which said rated weight indicator together with the comparator and said rated value indicator for basic time together with the output of the comparator is connected to said calculator.

* * * * *